United States Patent
Ogawa et al.

(10) Patent No.: US 12,429,249 B2
(45) Date of Patent: Sep. 30, 2025

(54) WATER HEATER

(71) Applicant: NORITZ CORPORATION, Hyogo (JP)

(72) Inventors: Kyohei Ogawa, Hyogo (JP); Shota Mizuno, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 290 days.

(21) Appl. No.: 17/959,302

(22) Filed: Oct. 4, 2022

(65) Prior Publication Data

US 2023/0128874 A1  Apr. 27, 2023

(30) Foreign Application Priority Data

Oct. 25, 2021  (JP) ................................. 2021-173732

(51) Int. Cl.
*F24H 9/00* (2022.01)
*F24H 9/02* (2006.01)

(52) U.S. Cl.
CPC .............. *F24H 9/001* (2013.01); *F24H 9/02* (2013.01); *F24H 9/0026* (2013.01); *F24H 9/0031* (2013.01); *Y02B 30/00* (2013.01)

(58) Field of Classification Search
CPC .......... F24H 9/001; F24H 9/02; F24H 9/0026; F24H 9/0031; Y02B 30/00
USPC ....................................................... 122/17.1
See application file for complete search history.

(56) References Cited

U.S. PATENT DOCUMENTS

| | | | |
|---|---|---|---|
| 6,769,425 B1 * | 8/2004 | Kim ......................... | F23M 9/02 126/110 A |
| 2004/0222309 A1 * | 11/2004 | Skertich .............. | F24D 19/0087 237/50 |
| 2020/0072504 A1 * | 3/2020 | Goto ......................... | F16L 5/10 |

FOREIGN PATENT DOCUMENTS

| | | | | |
|---|---|---|---|---|
| JP | S5314233 | | 2/1978 | |
| JP | H0474609 | | 11/1992 | |
| JP | H09329323 | | 12/1997 | |
| JP | 2014159889 | | 9/2014 | |
| JP | 6730112 | | 7/2020 | |
| JP | 6730112 | B2 * | 7/2020 | ................ F23C 7/02 |

OTHER PUBLICATIONS

JP 6730112 B2—Translation (Year: 2020).*

* cited by examiner

*Primary Examiner* — Steven B Mcallister
*Assistant Examiner* — Benjamin W Johnson
(74) *Attorney, Agent, or Firm* — JCIPRNET

(57) ABSTRACT

The disclosure provides a water heater. The water heater includes a water heater main body portion including a heat exchanger and a combustion device; a fan and a motor for driving the fan; an exterior case; and an air supply adapter mounted to an upper wall portion of the exterior case. The combustion device and the motor are positioned in a region near an upper portion within the exterior case. The combustion device is at least partly positioned between the air supply adapter and the fan in a plan view. An air outlet of the air supply adapter opens substantially horizontally, avoiding a direction directly facing the motor. The air flowing out from the air outlet is changed in direction by a side wall portion of the exterior case and flows to reach a portion of the motor.

10 Claims, 4 Drawing Sheets

// WATER HEATER

CROSS-REFERENCE TO RELATED APPLICATION

This application claims the priority benefits of Japanese application no. 2021-173732, filed on Oct. 25, 2021. The entity of the above-mentioned patent application is hereby incorporated by reference herein and made a part of this specification.

BACKGROUND

Technical Field

The disclosure relates to a hot water supply device such as a water heater.

Related Art

A specific example of the water heater is disclosed in Patent Literature 1.

In the water heater described in the same literature, a water heater main body portion is housed in an exterior case. The water heater main body portion includes a heat exchanger for heating hot water and a combustion device for supplying combustion gas to the heat exchanger, and by recovering heat from the combustion gas with the heat exchanger, water to be heated sent to the heat exchanger is heated, and hot water may be generated. Moreover, an air supply adapter for taking in outside air into the exterior case is provided in an upper wall portion of the exterior case, and a fan for supplying a mixed gas of fuel gas and air to the combustion device, and a motor for driving the fan are also housed in the exterior case.

The motor often include built-in electronic parts such as ICs and capacitors that are vulnerable to heat, which need to be protected.

Therefore, in Patent Literature 1, a duct-like air supply box is incorporated in the exterior case for guiding the air flowing out from the air outlet of the air supply adapter to above the motor and then making it flow toward the motor. According to such a configuration, it is possible to cool the motor by the air taken into the exterior case, and to suppress thermal damage to the motor.

Without the air supply box described above, it is difficult to effectively cool the motor by simply just having the air taken into the exterior case flow downward from the air outlet of the air supply adapter, for example. Moreover, if there is a combustion device below the air supply adapter, an outer surface of this combustion device becomes relatively hot during operation of the water heater, thus the temperature of the air flowing downward from the air supply adapter rises by contacting the outer surface of the combustion device. Therefore, even if such air subsequently flows toward the motor, it cannot efficiently cool the motor. Such a problem can be solved according to Patent Literature 1.

However, although in the prior art, an air supply box is used as a means of cooling the motor for guiding the air flowing out from the air outlet of the air supply adapter to above the motor and then making it flow toward the motor, this air supply box is duct-like in shape with a relatively large size. When the distance between the air supply adapter and the motor is long, the air supply box becomes larger. As a result, problems such as an increase in manufacturing cost and weight, and difficulty in securing a space for mounting the air supply box are likely to occur. Therefore, it is desirable to solve such a problem.

CITATION LIST

Patent Literature

[Patent Literature 1] Japanese Patent No. 6730112
[Patent Literature 2] Japanese Examined Patent Publication No. 4-74609
[Patent Literature 3] Japanese Unexamined Patent Publication No. 9-329323
[Patent Literature 4] Japanese Unexamined Patent Publication No. 2014-159889
[Patent Literature 5] Japanese Utility Model Laid-Open No. 53-14233

The disclosure was conceived under the circumstances as described above, and the disclosure provides a water heater capable of effectively cooling a predetermined motor by using air taken into an exterior case from outside without using a large special member.

The disclosure takes the following technical measures.

SUMMARY

A water heater provided by the disclosure includes a water heater main body portion including a heat exchanger for heating hot water and a combustion device for supplying combustion gas to the heat exchanger; a fan for supplying a mixed gas or an air for combustion to the combustion device and a motor for driving the fan; an exterior case having an upper wall portion and a side wall portion forming a housing space for housing the water heater main body portion, the fan, and the motor; and an air supply adapter mounted to the upper wall portion and having an air outlet for having outside air flow into the exterior case. The combustion device and the motor are positioned in a region near an upper portion within the exterior case, and the combustion device is at least partly positioned between the air supply adapter and the fan in plan view. The air outlet of the air supply adapter opens substantially horizontally, avoiding a direction directly facing the motor, and the air flowing out from the air outlet is changed in direction by the side wall portion of the exterior case and flows to reach a position of the motor.

In the disclosure, preferably, the air outlet is obliquely opposed to the side wall portion, and the air flowing out from the air outlet hits the side wall portion and is at least partly reflected so as to reach the position of the motor.

In the disclosure, preferably, a guide member for guiding the air flowing out from the air outlet and hitting the side wall portion to flow toward the motor is further included.

In the disclosure, preferably, the water heater main body portion includes an exhaust gas flow passage forming member for guiding an exhaust gas that has completed heat recovery through the heat exchanger to an outside of the exterior case, and the guide member is provided on the exhaust gas flow passage forming member.

In the disclosure, preferably, as an exhaust gas flow passage forming member for guiding the exhaust gas that has completed heat recovery through the heat exchanger to an outside of the exterior case, the water heater main body portion includes an exhaust duct cover connected to an exhaust adapter mounted to the upper wall portion of the exterior case and provided in the region near the upper portion within the exterior case. The air outlet of the air supply adapter is positioned between an upper surface portion of the exhaust duct cover and the upper wall portion of the exterior case in a vertical height direction.

In the disclosure, preferably, a cooling object member other than the motor is disposed in an air-flow path from the air supply adapter to the motor.

BRIEF DESCRIPTION OF THE DRAWINGS

Other features and advantages of the disclosure will become more apparent from the following description of embodiments of the disclosure with reference to the accompanying drawings.

DESCRIPTION OF THE EMBODIMENTS

Figure 1:
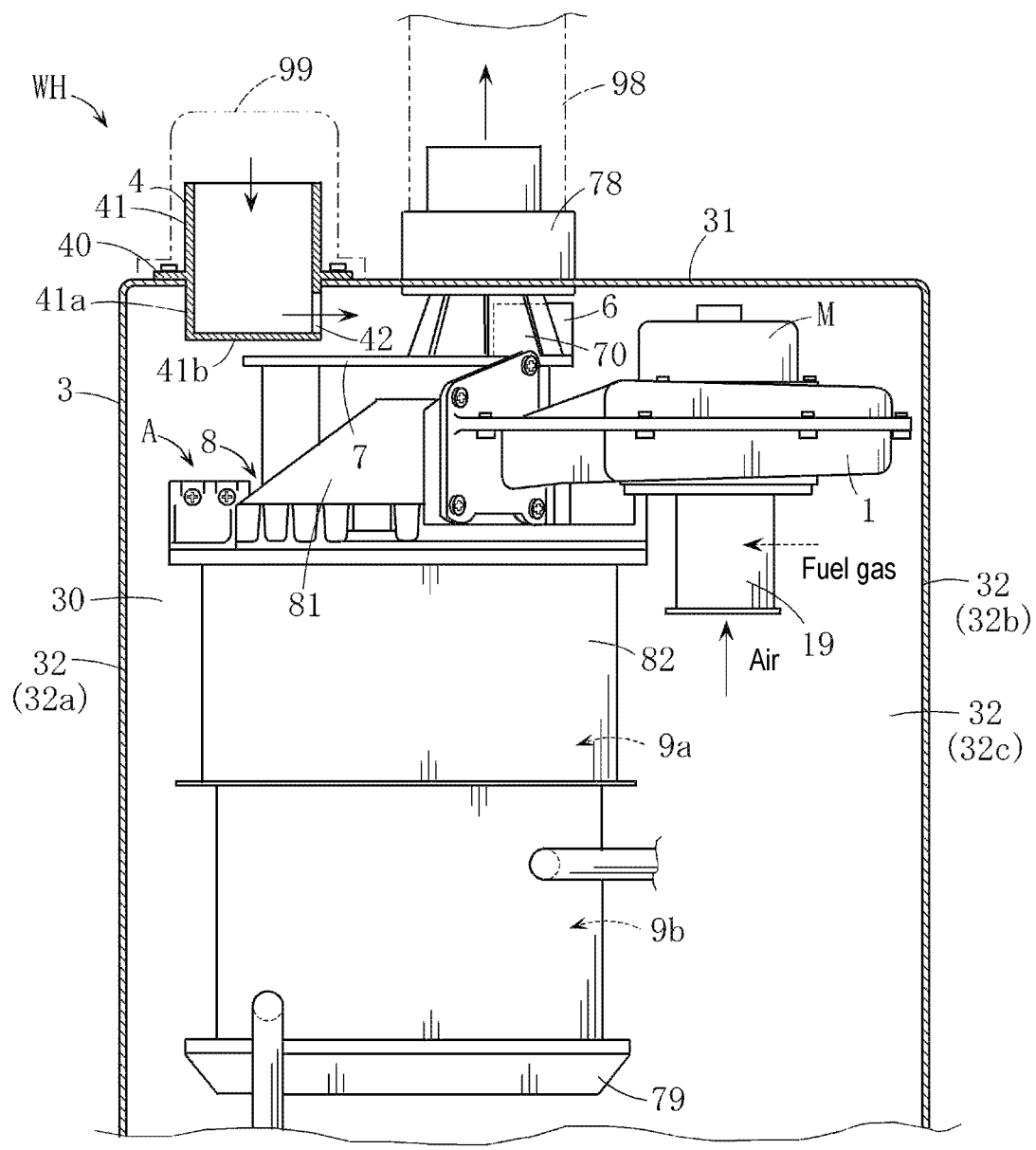
FIG. 1 is a schematic cross-sectional front view of a main part showing an example of a water heater according to the disclosure.

According to such a configuration, the following effects are obtained.

First, the outside air taken into the exterior case through the air supply adapter flows out from the air outlet of the air supply adapter substantially horizontally, therefore not much air flows toward below the air supply adapter. For this reason, it is possible to prevent or suppress the air from coming into contact with the outer surface of the combustion device, and appropriately avoid supplying the air with increased [in] temperature to the motor.

On the other hand, in plan view, since the combustion device is at least partly positioned between the air supply adapter and the fan, for example, if the air is simply just made to flow directly from the air supply adapter to the motor, as a result of the intake operation of the fan, much of this air flows in such a way to touch the outer surface of the combustion device, which may result in an increase in temperature. This makes it difficult to appropriately supply low-temperature air to the motor. In contrast, according to the disclosure, the air flows out from the air outlet of the air supply adapter in a direction other than toward the motor, and this air is changed in direction by the side wall portion of the exterior case, thereby reaching the position of the motor. Therefore, an air-flow path may be a detour path that does not pass through an upper side of the combustion device or does not pass through it as much as possible. In other words, in the process in which the air flows from the air supply adapter toward the motor, it is possible to allow the air to act on the motor after preventing the air from being strongly affected by the combustion device and causing a large temperature rise. Therefore, it is possible to effectively cool and protect the motor.

As described above, according to the disclosure, the side wall portion of the exterior case is used as a means for guiding air to the position of the motor, and there is no need to use the large duct-like air supply box used in Patent Literature 1. Therefore, it is possible to suppress an increase in manufacturing cost and an increase in weight. Moreover, it is possible to solve the problem of having difficulty securing a space for mounting the air supply box.

According to such a configuration, it is possible to effectively supply air to the position of the motor by using the side wall portion of the exterior case as an air reflecting wall. Such a configuration is more preferable for increasing the amount of air flowing toward the motor and improving the cooling efficiency of the motor.

According to such a configuration, rationalization and simplification of the mounting structure of the guide member are achieved. Moreover, since the temperature of the outer surface of the exhaust gas flow passage forming member is lower than that of the combustion device, the guide member itself does not become hot, and the temperature of the air guided by the guide member does not rise. Moreover, even if the air guided by the guide member comes into contact with the exhaust gas flow passage forming member, the temperature rise still can be suppressed, and the motor can be appropriately cooled using the air.

According to such a configuration, the air flowing out from the air outlet of the air supply adapter flows through a region between the upper surface of the exhaust duct cover and the upper wall portion of the exterior case toward the motor. The temperature of the upper surface (outer surface) of the exhaust duct cover is lower than that of the combustion device. Therefore, the air may be directed toward the motor while the temperature rise is suppressed. Further, the exhaust duct cover may also function as an air descending prevention member that prevents the air flowing out from the air outlet from flowing downward.

Such a configuration is rational because it is possible to cool a cooling object member other than the motor.

Preferred embodiments of the disclosure will be specifically described below with reference to the drawings.

Figure 2:
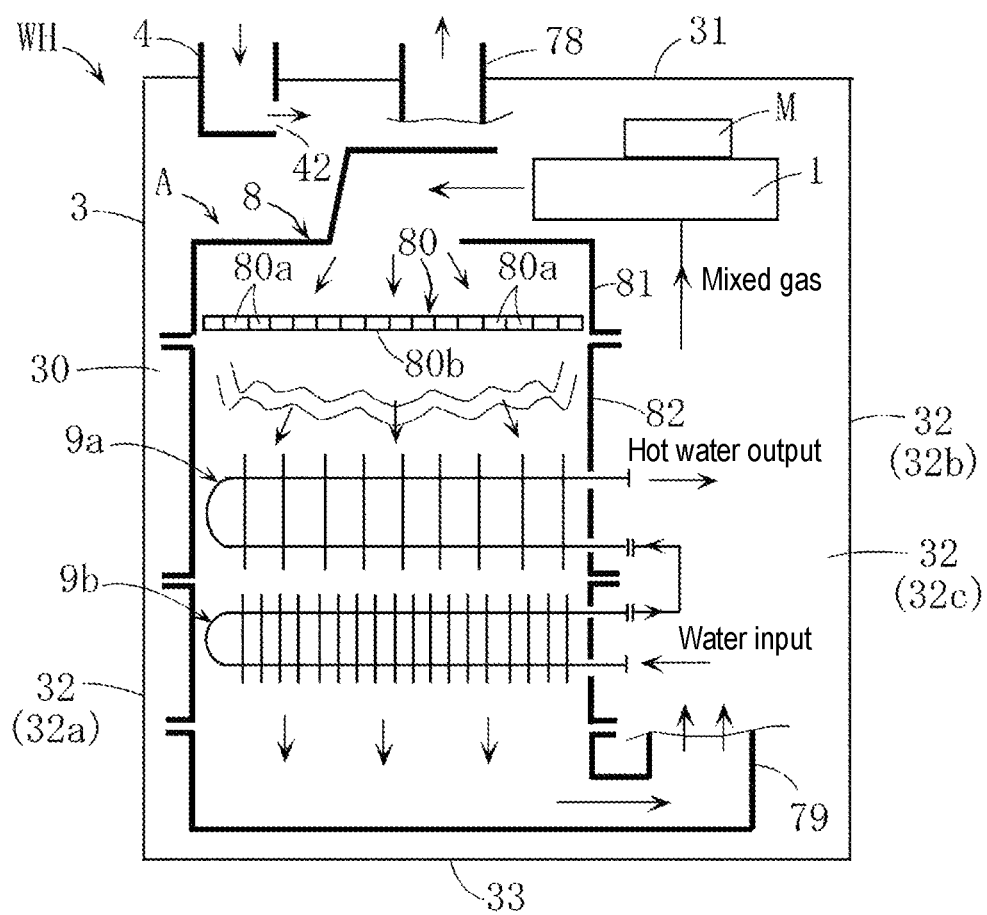
FIG. 2 is a schematic explanatory view showing a schematic configuration of the water heater shown in FIG. 1.
Figure 3:
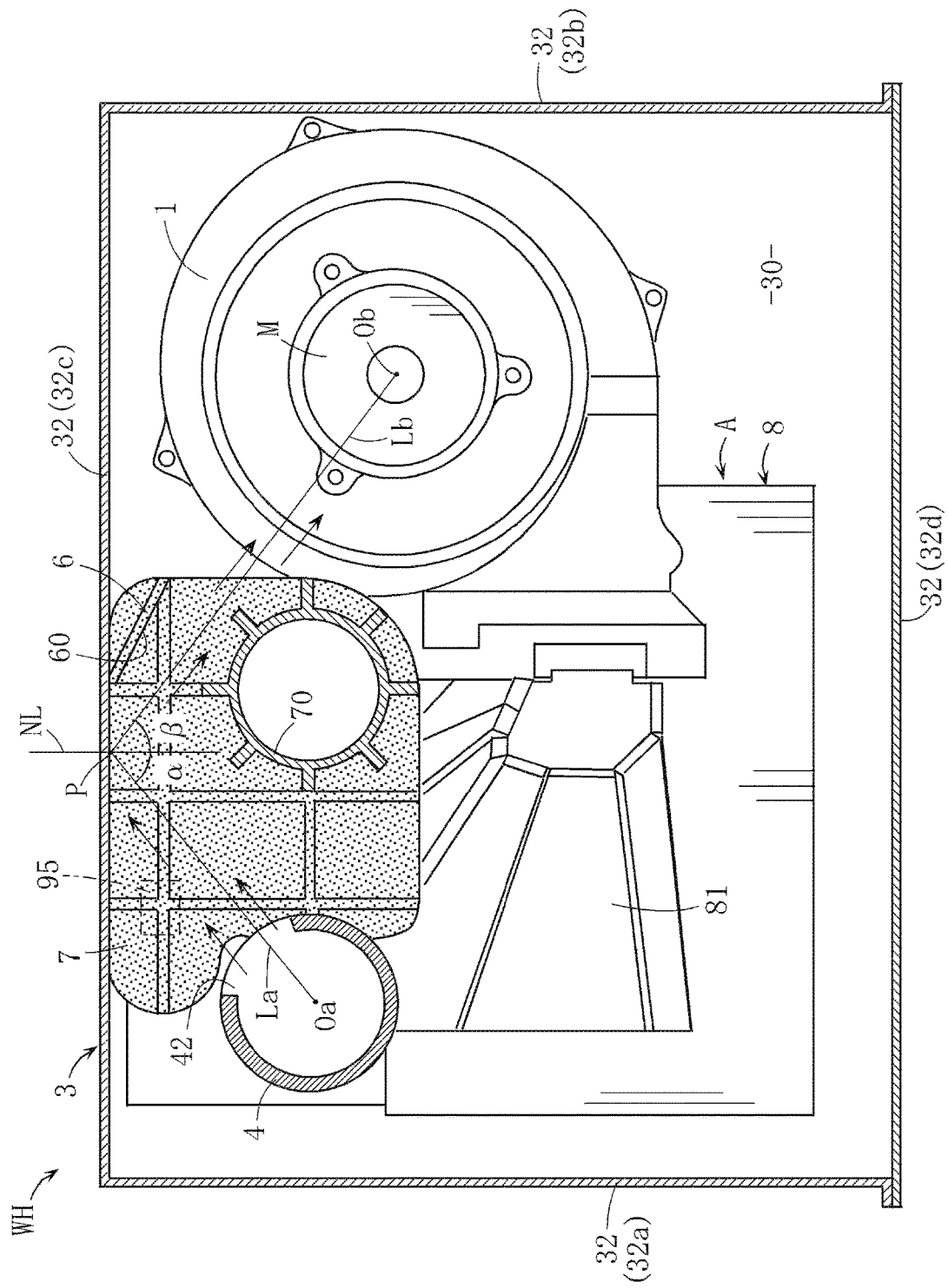
FIG. 3 is a planar cross-sectional view of the water heater shown in FIG. 1.

A water heater WH shown in FIGS. 1 and 2 is configured as a hot water supply device, and includes: a water heater main body portion A; a fan 1 and a motor M for driving the fan; an exterior case 3; an air supply adapter 4; an exhaust adapter 78; and an exhaust duct cover 7 provided with a guide member 6 (not shown in FIG. 2, and marked with dot pattern in FIG. 3).

The exterior case 3 has a substantially rectangular parallelepiped hollow shape, and forms therein a housing space 30 for housing main constituent members of the water heater WH such as the water heater main body portion A, the fan 1, the motor M, and the exhaust duct cover 7. The exterior case 3 has an upper wall portion 31, a plurality of side wall portions 32, and a lower wall portion 33, which are formed using, for example, a thin metal plate. The plurality of side wall portions 32 is divided into a pair of left and right side wall portions 32a, 32b, a rear side wall portion 32c, and a front side wall portion 32d (see FIG. 3). The front side wall portion 32d is a so-called front panel that may be attached to and detached from other parts of the exterior case 3.

The fan 1, such as a centrifugal fan, has a premix device 19 connected to an intake port provided on a lower surface, and the motor M for driving mounted on an upper surface. When the fan 1 is driven, while the air in the exterior case 3 is taken into the premix device 19, a fuel gas flows in from a fuel gas supply pipe (not shown) connected to the premix device 19, and a mixed gas for combustion is produced by mixing the fuel gas and air. The mixed gas is supplied from a discharge port of the fan 1 to a premix combustion device 8 (to be described later) of the water heater main body portion A.

The water heater main body portion A includes a combustion device 8, primary and secondary heat exchangers 9a and 9b, and an exhaust duct 79.

The combustion device 8 is of a premix type as described above, and includes a burner 80, a burner upper case 81 surrounding the burner 80, and a burner main case 82. The burner 80 includes a porous plate 80b having a plurality of vent holes 80a. The burner upper case 81 is connected to the discharge port side of the fan 1 such that the mixed gas for combustion discharged from the fan 1 may be supplied to the porous plate 80b from above. The burner 80 is provided with an ignition plug (not shown) and the like. The mixed gas passes through the plurality of vent holes 80a and combusts below the porous plate 80b. The inside of the burner main case 82 corresponds to a combustion chamber.

The primary and secondary heat exchangers 9a and 9b are of a heat transfer tube type and are provided below the combustion device 8. The combustion gas generated by the combustion device 8 acts on the primary and secondary heat exchangers 9a and 9b, and the sensible heat and latent heat are sequentially recovered, whereby the water to be heated passing through the heat transfer tubes of the primary and secondary heat exchangers 9a and 9b is heated. Thereby, hot water is generated, and the hot water is supplied to a desired hot water supply destination.

Figure 5:
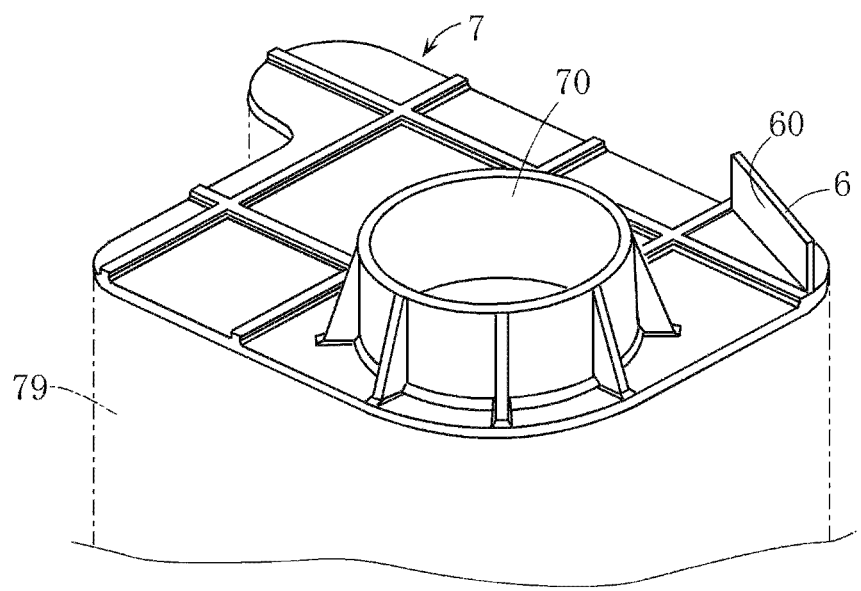
FIG. 5 is a perspective view of an exhaust duct cover (exhaust gas flow passage forming member) with a guide member used in the water heater shown in FIG. 1.

The exhaust gas of the combustion gas that has passed through the primary and secondary heat exchangers 9a and 9b passes through the exhaust duct 79 and a cylindrical portion 70 (to be described later) of the exhaust duct cover 7, reaches the exhaust adapter 78 provided on the upper wall portion 31 of the exterior case 3, and is exhausted to the outside of the exterior case 3. The exhaust duct 79 is provided so as to rise from a position on a lower side of the secondary heat exchanger 9b to an upper region within the exterior case 3, and the exhaust duct cover 7 is mounted to the upper portion of the exhaust duct 79. The exhaust duct cover 7, as shown in FIG. 5, includes the cylindrical portion 70 that stands up in the vertical height direction, and an upper portion of the exhaust duct 79 and a lower portion of the exhaust adapter 78 are connected via the cylindrical portion 70 such that the exhaust gas flows from the exhaust duct 79 to the exhaust adapter 78.

The exhaust duct cover 7 corresponds to an example of an exhaust gas flow passage forming member according to the disclosure, and is made of resin, for example.

The air supply adapter 4 is made of resin, for example, and, similar to the exhaust adapter 78, is mounted to the upper wall portion 31 of the exterior case 3. In FIG. 1, reference numeral 99 indicates a cover body for covering the air supply adapter 4, and reference numeral 98 indicates an external exhaust duct connected to the exhaust adapter 78.

Figure 4:
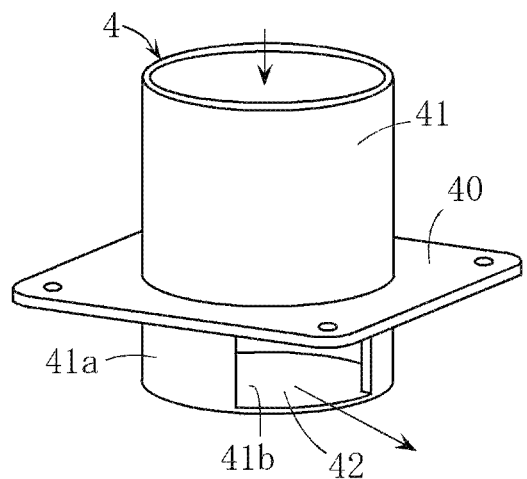
FIG. 4 is a perspective view of an air supply adapter used in the water heater shown in FIG. 1.

The air supply adapter 4 is in a form as shown in FIG. 4, and includes: a horizontal flange plate portion 40 for the mounting to the upper wall portion 31 of the exterior case 3; and a substantially cylindrical main body portion 41 provided so as to vertically penetrate the flange plate portion 40. A lower region 41a of the main body portion 41 positioned below the flange plate portion 40 is a region protruding downward below the upper wall portion 31 of the exterior case 3, and an air outlet 42 that opens substantially horizontally is provided in a side peripheral surface of the lower region 41a. A bottom portion 41b of the lower region 41a is closed. In the operation of the water heater WH, when the fan 1 is driven, a negative pressure is generated inside the exterior case 3, so the outside air flows into the air supply adapter 4 through its upper opening and flows out into the exterior case 3 through the air outlet 42.

The air supply adapter 4 is mounted to the upper wall portion 31 of the exterior case 3 as described above. The air outlet 42 of the air supply adapter 4 is positioned between the upper surface of the exhaust duct cover 7 and the upper wall portion 31 of the exterior case 3 in the vertical height direction. On the other hand, the fan 1 and driving motor M for driving the fan, the burner upper case 81 of the combustion device 8, and the exhaust duct cover 7 are all positioned near an upper portion of the exterior case 3, and have a positional relationship as shown in FIG. 3 in plan view.

That is, the fan 1 and the motor M are separated from the air supply adapter 4 by an appropriate distance in the horizontal direction, but in a plan view, part of the burner upper case 81 as well as the exhaust duct cover 7 are positioned between the fan 1 and the air supply adapter 4.

On the other hand, the air outlet 42 of the air supply adapter 4 opens substantially horizontally and is obliquely opposed to the side wall portion 32 (the rear side wall portion 32c) of the exterior case 3. To be more specific, the air outlet 42 is set in a direction such that the air flowing out from the air outlet 42 is reflected by the rear side wall portion 32c of the exterior case 3 and reaches the position of the motor M. Preferably, a position P, of the rear side wall portion 32c, where the air outlet 42 of the air supply adapter 4 faces is as follows: when two straight lines La and Lb are drawn respectively from a center Oa of the air supply adapter 4 and a center Ob of the motor M toward the position P, inclination angles α and β of the straight lines La and Lb with respect to a normal line NL passing through the position P are substantially the same. Moreover, the straight line Lb does not cross the cylindrical portion 70 provided on the exhaust duct cover 7.

The guide member 6 is a member for guiding the air reflected by the rear side wall portion 32c toward the motor M to increase the amount of air directed toward the motor M, and in plan view, includes a guide surface 60 inclined at substantially the same angle as the straight line Lb. As shown in FIG. 5, the guide member 6 is provided on the upper surface of the exhaust duct cover 7 and has a plate shape protruding upward. Preferably, the guide member 6 is integrally formed with the exhaust duct cover 7.

Next, the operation of the water heater WH will be described.

First, the outside air taken into the exterior case 3 via the air supply adapter 4 flows out from the air outlet 42 of the air supply adapter 4 substantially horizontally and hits the rear side wall portion 32c of the exterior case 3, and is reflected by the rear side wall portion 32c toward the motor M. In the operation of the water heater WH, the upper surface of the burner upper case 81 will reach a rather high temperature, but when the air flows through the path described above, the air does not come into contact with the burner upper case 81, resulting in a temperature rise, and then flows toward the Motor M. Therefore, it is possible to effectively cool the motor M by having the air that is not increased in temperature by the burner upper case 81 to act on the motor M. Although the motor M incorporates IC chips, capacitors, and the like, it is possible to prevent them from being thermally damaged.

When the air flowing out from the air outlet 42 of the air supply adapter 4 hits the rear side wall portion 32c of the exterior case 3 and is reflected, actually, this air flow does not flow in an orderly fashion, and the direction of reflection from the rear side wall portion 32c is uneven. On the other hand, the guide member 6 guides such air to flow toward the motor M. Therefore, it is possible to increase the amount of air acting on the motor M and further enhance the cooling effect of the motor M.

The guide member 6 is provided on the exhaust duct cover 7, but unlike the burner upper case 81, the exhaust duct cover 7 does not reach a high temperature. Therefore, there is no problem such as a significant temperature rise of the air guided by the guide member 6. Further, the exhaust duct cover 7 plays a role in suppressing the air flowing out from the air outlet 42 substantially horizontally from moving downward, and this also helps to increase the amount of air supplied to the motor M.

In this manner, according to the present embodiment, the rear side wall portion 32c of the exterior case 3 is used as means for guiding air to the position of the motor M for cooling. Therefore, compared with means using a duct-like air supply box having a large size, for example, it is possible to suitably reduce the manufacturing cost, the weight, and the like.

Although the guide member 6 is provided in this embodiment, since the guide member 6 is integrally formed with the exhaust duct cover 7, its manufacturing cost is low, and special screw fixing means for mounting the guide member 6 is not required. Furthermore, the guide member 6 may be a simple plate of relatively small size, and there is no need to worry about securing a space for mounting the guide member 6 thereon.

Moreover, in the water heater WH, as shown by a phantom line in FIG. 3, a cooling object member 95 other than the motor M may be disposed in the middle of the air-flow path from the air supply adapter 4 to the motor M. The type of the cooling object member 95 is not limited, but it may be, for example, an electric component, an electronic component, or the like that is vulnerable to heat.

The disclosure is not limited to the content of the embodiments described above. The specific configuration of each part of the water heater according to the disclosure may be changed in various ways within the intended scope of the disclosure.

In the above-described embodiment, the air flowing out from the air outlet 42 of the air supply adapter 4 is reflected by hitting the rear side wall portion 32c of the exterior case 3, but the disclosure is not limited to this. In the disclosure, it is also possible to have the air hit a rear side wall portion of the exterior case that is different from the side wall portion and reflected.

Moreover, in the disclosure, not only have the side wall portion of the exterior case reflect the air, alternatively, or further, the air may be directed toward the motor by flowing along the side wall portion of the exterior case.

In short, it is sufficient that the air outlet opens substantially horizontally, avoiding the direction directly facing the motor, and the air flowing out from the air outlet port is changed in direction by the side wall portion of the exterior case and flows to reach the position of the motor.

In the above-described embodiments, a premix combustor is used as the combustion device, but the disclosure is not limited thereto. If the combustion device is not a premix type, air for combustion instead of the mixed gas for combustion is supplied from the fan to the combustion device.

In the disclosure, the specific types of the fan and the motor for driving the fan are also not limited. The guide member may be formed separately from the exhaust duct cover, or may be mounted to the side wall portion of the exterior case, for example.

The water heater according to the disclosure is not limited to general hot water supply, and may be used for bath hot water supply, hot water heater, and the like.

What is claimed is:

1. A water heater, comprising:
a water heater main body portion comprising a heat exchanger for heating water and a combustion device for supplying combustion gas to the heat exchanger;
a fan for supplying a mixed gas or an air for combustion to the combustion device and a motor for driving the fan;
an exterior case having an upper wall portion and a side wall portion forming a housing space for housing the water heater main body portion, the fan, and the motor; and
an air supply adapter mounted to the upper wall portion and having an air outlet for having outside air flow into the exterior case;
wherein the combustion device and the motor are positioned in a region near an upper portion of the water heater within the exterior case, and the combustion device is at least partly positioned between the air supply adapter and the fan in a plan view, and
the air outlet of the air supply adapter opens substantially horizontally, avoiding a direction directly facing the motor, and the air flowing out from the air outlet is changed in direction by the side wall portion of the exterior case and flows to reach a position of the motor,
wherein the air outlet is configured to face the side wall portion at an oblique angle that deflects air flowing out from the air outlet around an exhaust duct of an exhaust gas flow passage forming member and into the side wall portion, wherein the side wall portion in turn deflects air to the position of the motor.

2. The water heater according to claim 1, further comprising:
a guide member for guiding the air flowing out from the air outlet and hitting the side wall portion to flow toward the motor.

3. The water heater according to claim 2,
wherein the water heater main body portion comprises the exhaust gas flow passage forming member for guiding an exhaust gas that has completed heat recovery through the heat exchanger to an outside of the exterior case, and
the guide member is provided on the exhaust gas flow passage forming member.

4. The water heater according to claim 1,
wherein the water heater main body portion comprises:
an exhaust duct cover acting as the exhaust gas flow passage forming member for guiding an exhaust gas that has completed heat recovery through the heat exchanger to an outside of the exterior case, the exhaust duct cover is connected to an exhaust adapter that is mounted to the upper wall portion of the exterior case, and the exhaust duct cover is provided in the region near the upper portion in the exterior case, and
wherein the air outlet of the air supply adapter is positioned between an upper surface of the exhaust duct cover and the upper wall portion of the exterior case in a vertical height direction.

5. The water heater according to claim 2,
wherein the water heater main body portion comprises:
an exhaust duct cover acting as the exhaust gas flow passage forming member for guiding an exhaust gas that has completed heat recovery through the heat exchanger to an outside of the exterior case, the exhaust duct cover is connected to an exhaust adapter mounted to the upper wall portion of the exterior case, and the exhaust duct cover is provided in the region near the upper portion in the exterior case, and wherein the air outlet of the air supply adapter is positioned between an upper surface of the exhaust duct cover and the upper wall portion of the exterior case in a vertical height direction.

6. The water heater according to claim 3, wherein, the water heater main body portion comprises:
an exhaust duct cover acting as the exhaust gas flow passage forming member for guiding an exhaust gas that has completed heat recovery through the heat exchanger to an outside of the exterior case, the exhaust duct cover is connected to an exhaust adapter mounted to the upper wall portion of the exterior case, and the exhaust duct cover is provided in the region near the upper portion in the exterior case, and wherein the air outlet of the air supply adapter is positioned between an upper surface of the exhaust duct cover and the upper wall portion of the exterior case in a vertical height direction.

7. The water heater according to claim 1,
wherein a cooling object member other than the motor is disposed in an air-flow path from the air supply adapter to the motor.

8. The water heater according to claim 2,
wherein a cooling object member other than the motor is disposed in an air-flow path from the air supply adapter to the motor.

9. The water heater according to claim 3,
wherein a cooling object member other than the motor is disposed in an air-flow path from the air supply adapter to the motor.

10. The water heater according to claim 4,
wherein a cooling object member other than the motor is disposed in an air-flow path from the air supply adapter to the motor.

\* \* \* \* \*